United States Patent

Kawana

(10) Patent No.: US 10,896,016 B2
(45) Date of Patent: Jan. 19, 2021

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yoshimasa Kawana, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 15/661,685

(22) Filed: Jul. 27, 2017

(65) Prior Publication Data
US 2018/0039465 A1 Feb. 8, 2018

(30) Foreign Application Priority Data

Aug. 5, 2016 (JP) .................................. 2016-154988

(51) Int. Cl.
*G06F 3/00* (2006.01)
*G06F 3/14* (2006.01)
*H04L 12/58* (2006.01)
*H04N 1/00* (2006.01)
*G06F 3/0484* (2013.01)

(52) U.S. Cl.
CPC ................ *G06F 3/14* (2013.01); *H04L 51/18* (2013.01); *H04N 1/00464* (2013.01); *G06F 3/04842* (2013.01); *G09G 2370/027* (2013.01); *H04N 2201/0094* (2013.01)

(58) Field of Classification Search
CPC ....... G06F 3/04842; G06F 3/14; H04L 51/18; G09G 2370/027; H04N 1/00464; H04N 2201/0094
See application file for complete search history.

(56) References Cited

U.S. PATENT DOCUMENTS

| 8,966,076 | B2 | 2/2015 | Kawana et al. | |
|---|---|---|---|---|
| 2010/0165392 | A1* | 7/2010 | Yabe | G06F 21/6218 358/1.15 |
| 2011/0307811 | A1* | 12/2011 | Kim | G06F 8/61 715/760 |
| 2015/0150077 | A1* | 5/2015 | Daimon | G06F 3/0481 726/1 |
| 2016/0099949 | A1* | 4/2016 | Leondires | G06F 21/6218 726/28 |

FOREIGN PATENT DOCUMENTS

JP 2004-334397 A 11/2004

\* cited by examiner

*Primary Examiner* — Anil N Kumar

(74) *Attorney, Agent, or Firm* — Carter, DeLuca & Farrell LLP

(57) ABSTRACT

Provided is a device in which an application having a web browser function is installed. The device controls a display on a local UI using content provided by a message providing service. The device accepts a selection of a link included in the display, determines whether a referrer of a link destination indicates a domain to which the message providing service belongs. If the referrer indicates the domain to which the message providing service belongs, the device controls display using content corresponding to the link destination, and if the referrer does not indicate the domain to which the message providing service belongs, the device controls display of a screen indicating that the link destination cannot be accessed.

9 Claims, 10 Drawing Sheets

FIG. 6A

Notification Center

ShippingStatus.COM

Invoice Number : 1234567890
Current Shipping Status : Now delivering
Scheduled Delivery Date and Time : Tomorrow afternoon

| Shipping Status Scheduled Date and Time | Delivery Route |
|---|---|
| 2016/04/19 15:54 (Shipped) | Tokyo Distribution Center |
| 2016/04/19 15:54 (Shipped) | Chuo Logistics Center |
| 2016/04/19 17:15 (Shipped) | Kansai Distribution Center |
| 2016/04/19 22:00 | Fukuoka Distribution Center |
| 2016/04/20 08:00 | Fukuoka Branch |

Advertisement A

Advertisement B

Other Links

FIG. 6B

Notification Center

ShippingStatus.COM

Screen transition to an external link.
Do you want to open a Browser?

X CANCEL          OK

Advertisement A

Advertisement B

Other Links

FIG. 9

```
HTTP/1.1 200 OK
Server: Apache-Coyote/1.1
Content-Type: text/html;charset=UTF-8
Content-Language: ja
Content-Length: 2092
Date: Wed, 11 May 2016 03:57:08 GMT
Permit-Domain : haisoujoukyou.com,takuhai.co.jp <!DOCTYPE html>
<html>
<head>
<link rel="stylesheet" href="/webjars/bootstrap/3.2.0/css/bootstrap.min.css" />
<link rel="stylesheet" href="/css/common.css" />
<title>Message List</title>
```

INFORMATION PROCESSING APPARATUS, CONTROL METHOD, AND STORAGE MEDIUM

BACKGROUND OF THE INVENTION

Field of the Invention

The present invention relates to an information processing apparatus, a control method, and a storage medium.

Description of the Related Art

Conventionally, in a system that performs maintenance on a device such as a copying machine or the like, provides notification to an operator of a sales company, a service man, a person in charge of consumption, or the like, according to an error, an alarm, or information such as a paper jam, about which the device provides notification. When there is a message from a sales company that performs maintenance to be communicated to a customer (user), the following method may be considered besides calling by telephone or sending an email. Specifically, a method using an application that displays a message from a message providing service directly on a local user interface (UI) of the device such as an operation screen may be considered.

In order to display a message on the UI of the device, a method for distributing the message by HTML content using WEB technology is preferable. For example, transmitting a shipping status of a toner that has been delivered as a message relating to maintenance may be considered. In such a case, a sales company introduces a link to a web page of a delivery company so that the shipping status of the toner can be transmitted directly from a network service of the delivery company to the user.

In contrast, due to the application, which uses the UI of the device and has web browser function, being provided, the user can freely browse a web page that the user wants to see, and thereby the user may take possession of the operation screen. In a device such as a copying machine, if one user occupies the device for a long time for browsing a webpage, the copying machine will not be available for other users. Therefore, in an application having web browser function, it is necessary to perform access control so as not to display a page that is not directly related to a maintenance business.

Japanese Patent Laid-Open No. 2004-334397 discloses an access control method for restricting access to reference destination document information by describing reference source document information about content on a network.

However, by the access control method disclosed in Japanese Patent Laid-Open No. 2004-334397, whether or not to actually output the reference destination document information is determined based on the result whether or not text information included in the reference source document information satisfies a predetermined condition. However, in the access control performed in an application having a web browser function, it is preferable not to perform the access control according to the text information included in the reference source document information, in other words, not according to the content of the digital contents but whether or not the domain of the reference source is reliable.

SUMMARY OF THE INVENTION

The present invention provides an information processing apparatus to enable performing display control appropriately in an application having web browser function.

According to an aspect of the present invention, an information processing apparatus in which an application having a web browser function is installed is provided. The apparatus comprises: a control unit configured to control the display on a displaying unit using content provided by a predetermined providing service that belongs to a predetermined domain; an accepting unit configured to accept a selection of a link included in the display; and a determining unit configured to determine whether a referrer of a link destination corresponding to the accepted selection indicates the predetermined domain, wherein, if the referrer indicates the predetermined domain, the control unit controls display using content corresponding to the link destination, and wherein, if the referrer does not indicate the predetermined domain, the control unit controls display of a screen indicating that the link destination cannot be accessed.

Further features of the present invention will become apparent from the following description of exemplary embodiments (with reference to the attached drawings).

BRIEF DESCRIPTION OF THE DRAWINGS

FIGS. 6A and 6B are diagrams each illustrating an example of a UI of the "Notification center" application.

FIG. 9 is a diagram illustrating an example of content data provided by a message providing service.

DESCRIPTION OF THE EMBODIMENTS

Hereinafter, preferred embodiments of the present invention will be described with reference to attached drawings and the like.

First Embodiment

<Exemplary Configuration of a Device Management System>

Figure 1:
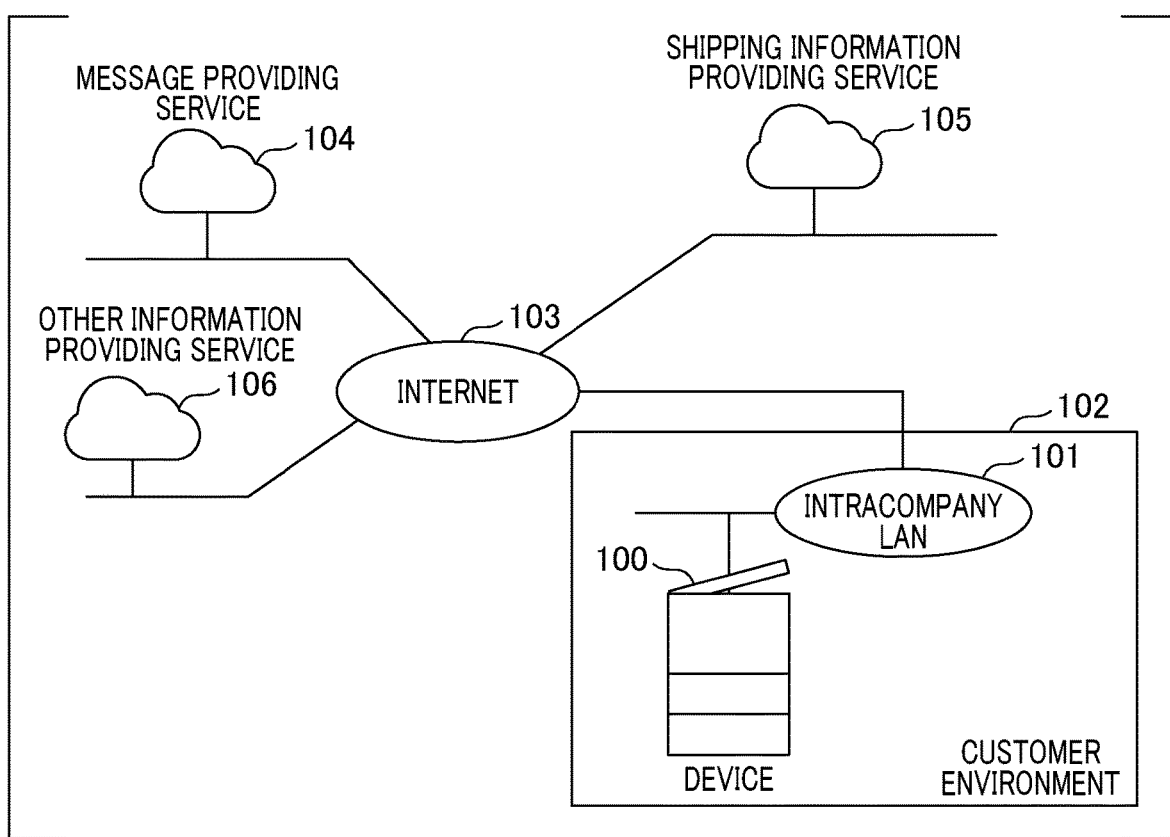
FIG. 1 is a diagram illustrating connection relations of networks of an information processing apparatus according to one embodiment.

FIG. 1 is a diagram illustrating connection relations of networks between a device management system including a device and a message providing service and other web services according to one embodiment of the present invention.

A device 100 is an information processing apparatus that is connected to a customer's intracompany LAN (Local Area Network) 101, for example a MFP (Multi-Function Printer), SFP (Single Function Printer), or the like.

In the present embodiment, the device 100 has a function of printing or copying or the like, but it is not limited to these functions. As long as the device 100 is an information processing apparatus capable of installing an application that can browse content on a network, the device 100 is not limited to having a specific function such as printing or copying in particular.

In a LAN 101, a plurality of PCs, servers, or other devices are connected in addition to the device 100. In FIG. 1, this environment is shown as a customer environment 102. In an internet 103, innumerable environments similar to the customer environment 102 are connected. A message providing service 104 is a service that a sales company of the device 100 uses. In the device 100, an application for displaying message content, which is issued by the sales company, related to maintenance is installed. Hereinafter, this application is referred to as "Notification center" application.

When the "Notification center" application is started, the "Notification center" application accesses the message providing service 104 for transmitting identification information that is a serial number of the device 100. Then, individual message content prepared by the sales company for displaying on the device 100 is provided from the message providing service 104 to the "Notification center" application. The content of the message content is a message related to a variety of maintenance, for example, a shipping notification for a toner that has been delivered from the sales company, an advance notice of version upgrade of firmware, or the like.

A shipping information providing service 105 is a service that the delivery company uses. In a shipping notification about a toner that is one of the message contents issued by the sales company, a link is included in a message so as to enable referring to the shipping information providing system 105 that the delivery company uses. A user can confirm details of a shipping status of a toner by tracking the link included in the message.

Another information providing service 106 indicates one of innumerable other information providing services that are connected to the internet 103. The other information providing service 106 is a site or the like that is not directly related to maintenance business of the sales company of the device 100, for example, a site that provides news or a site that provides personal blogs.

In the device 100, a browser application (web browser program) can be installed. The browser application may be an application that the customer has purchased for pay or a free application. If the browser application is installed in the device, the user can access, via the browser, the shipping information providing service 105, the other information providing service 106, or the like, which are on the internet.

<Local UI of the Device>

Figure 2:
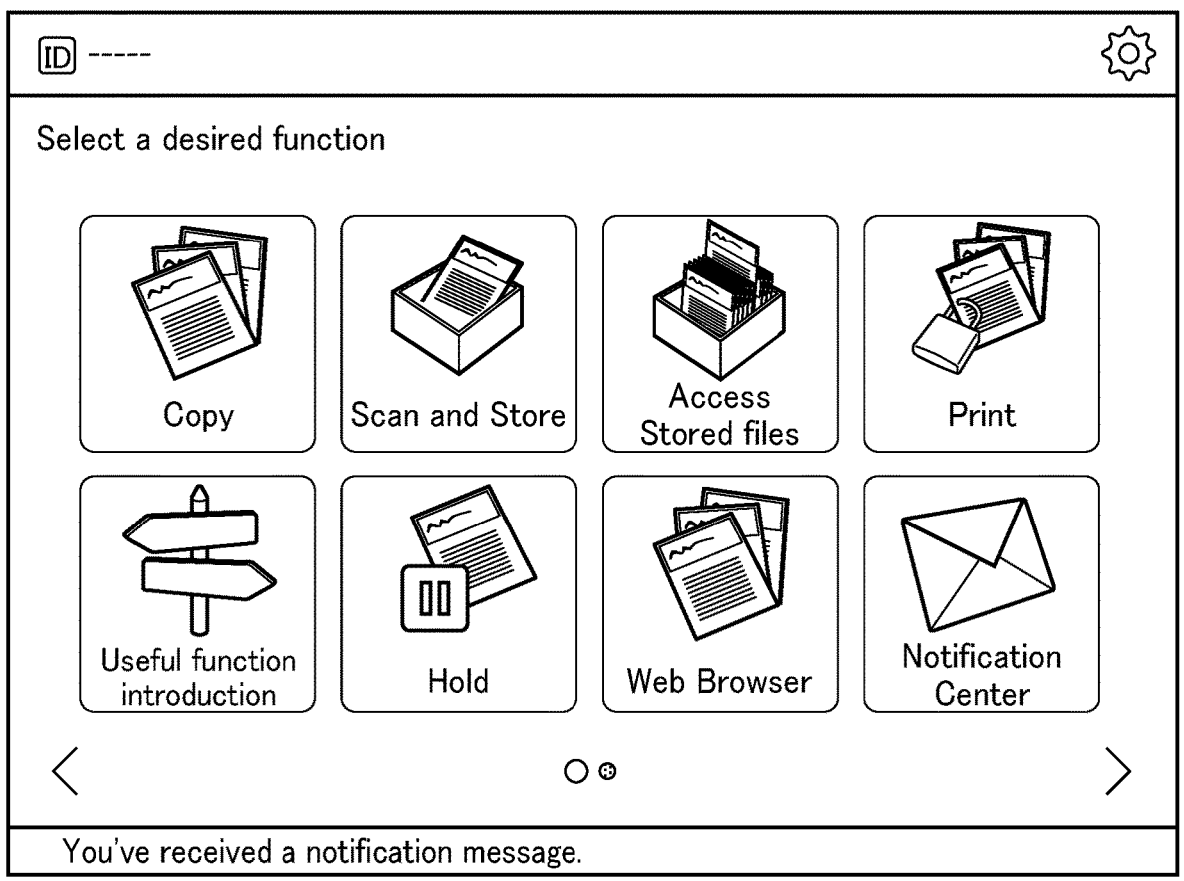
FIG. 2 is a diagram illustrating an example of a local UI of a device.

FIG. 2 is a diagram illustrating an example of a local UI that is a displaying unit of the device 100.

When the user uses the device 100, the user operates a home screen displayed on the local UI. For example, if the user wants to copy, the user presses the "Copy" icon displayed on the home screen. As a result, a copy application starts for the user to set the type of the copy, such as double sided copy, color copy, or the like, via the screen of the copy application, and thereby the copy behavior to which the user intended can be performed.

The home screen includes icons such as "Web browser", "Notification center", or the like, in addition to the copy application. These icons will be displayed when the browser application and "Notification center" application are installed. When a maintenance contract of the device 100 is not concluded with the sales company or a service office, the "Notification center" application will not be installed, and therefore, the icon will not be displayed on the local UI.

If the user wants to browse the internet using the device 100, the user presses the "Web browser" icon and starts the browser application. If the user wants to confirm a message related to the maintenance service from the sales company, the user presses the "Notification center" icon and stars the "Notification center" application.

<Exemplary Hardware Configuration of the Device>

Figure 3:
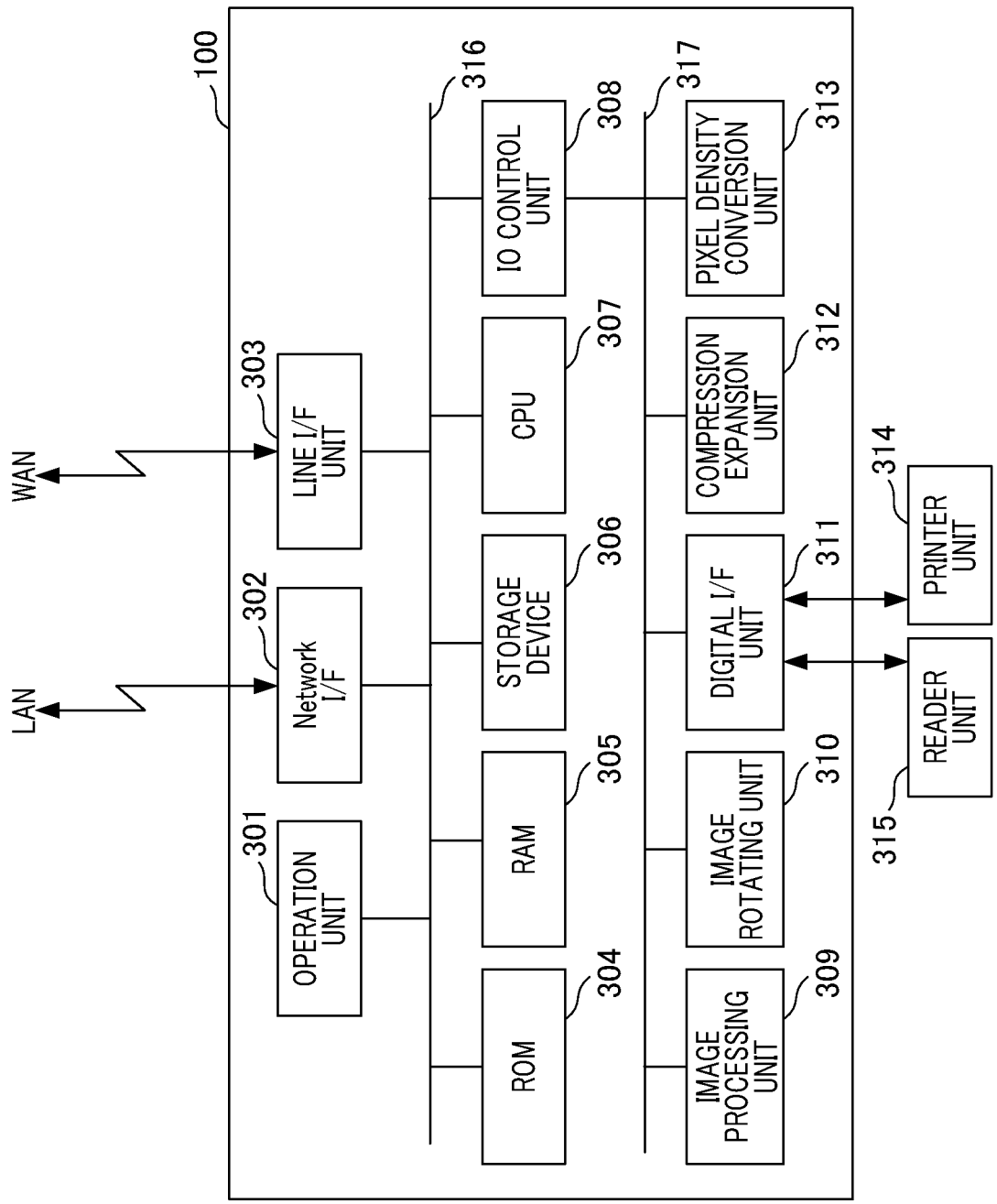
FIG. 3 is a diagram illustrating a hardware configuration of a control unit of the device.

FIG. 3 is a diagram illustrating a hardware configuration of a control unit of the device 100.

In a control unit of the device 100, control processing for copying or printing is mainly performed, and additionally, each applications such as a device state monitoring program, the browser application, the "Notification center" application, or the like, is controlled.

The device 100 includes components that perform system management and components that perform image processing management. The components that perform system management are an operation unit 301, a Network I/F unit 302, a line I/F unit 303, a ROM 304, a RAM 305, a storage device 306, and a CPU 307. The components that perform image processing management are an IO control unit 308, an image processing unit 309, an image rotating unit 310, a digital I/F unit 311, a compression expansion unit 312, and a pixel density conversion unit 313.

Each of the components of the control unit is connected to a system bus 316 and an image bus 317. The ROM 304 stores a control program for copying, printing, a device status monitoring program, or the like, and those programs are executed by the CPU 307. The RAM 305 is a work memory area for executing a program and an image memory for temporarily storing image data or network content required for executing various application programs.

The storage device 306 is a nonvolatile storage device and stores general programs such as the browser application, "Notification center" application, or the like. The CPU 307 controls each processing unit of the device 100 directly or indirectly, and executes various programs as described above. In the storage device 306, license information or setting data, which must be maintained even after the device 100 is rebooted, for the various applications is stored.

The Network I/F unit 302 is an interface unit for connecting to the LAN 101, and performs communication with various computers on the network via the LAN 101. The line I/F unit 303 is connected to a public telephone network, is controlled by a communication control program stored in the ROM 304, and performs transmission and reception of data between a remote terminal via a device such as a modem. Transmission and reception of a facsimile is also performed by using the line I/F unit 303.

The operation unit 301 incorporates a display unit or a key input unit, and is controlled by the CPU 307. The user performs various settings related to scanning or printing through the key input unit and provides instructions to activate or stop scanning or printing. The IO control unit 308 is a bus bridge for connecting the system bus 316 with the image bus 317, which transfers image data at high speed. The image bus 317 consists of a PCI bus or IEEE 1394. The following devices are placed on the image bus 317.

The digital I/F unit 311 connects a reader unit 315 or the printer unit 314 of the device to the control unit and performs synchronous/asynchronous conversion of image data. Information detected by various sensors that are placed in each location of the reader unit 315 and the printer unit 314 flows to the system bus 316 via the digital I/F unit 311 and the IO control unit 308.

The image processing unit 309 corrects/processes/edits input image data and output image data. The image rotating unit 310 rotates the image data. The compression expansion unit 312 performs compression expansion processing of JPEG for multi-level image data and performs compression and expansion processing of JBIG/MMR/MR/MH for binary image data. The pixel density conversion unit 313 performs resolution conversion or the like on the output image data.

<Exemplary Software Module Configuration of the Device>

Figure 4:
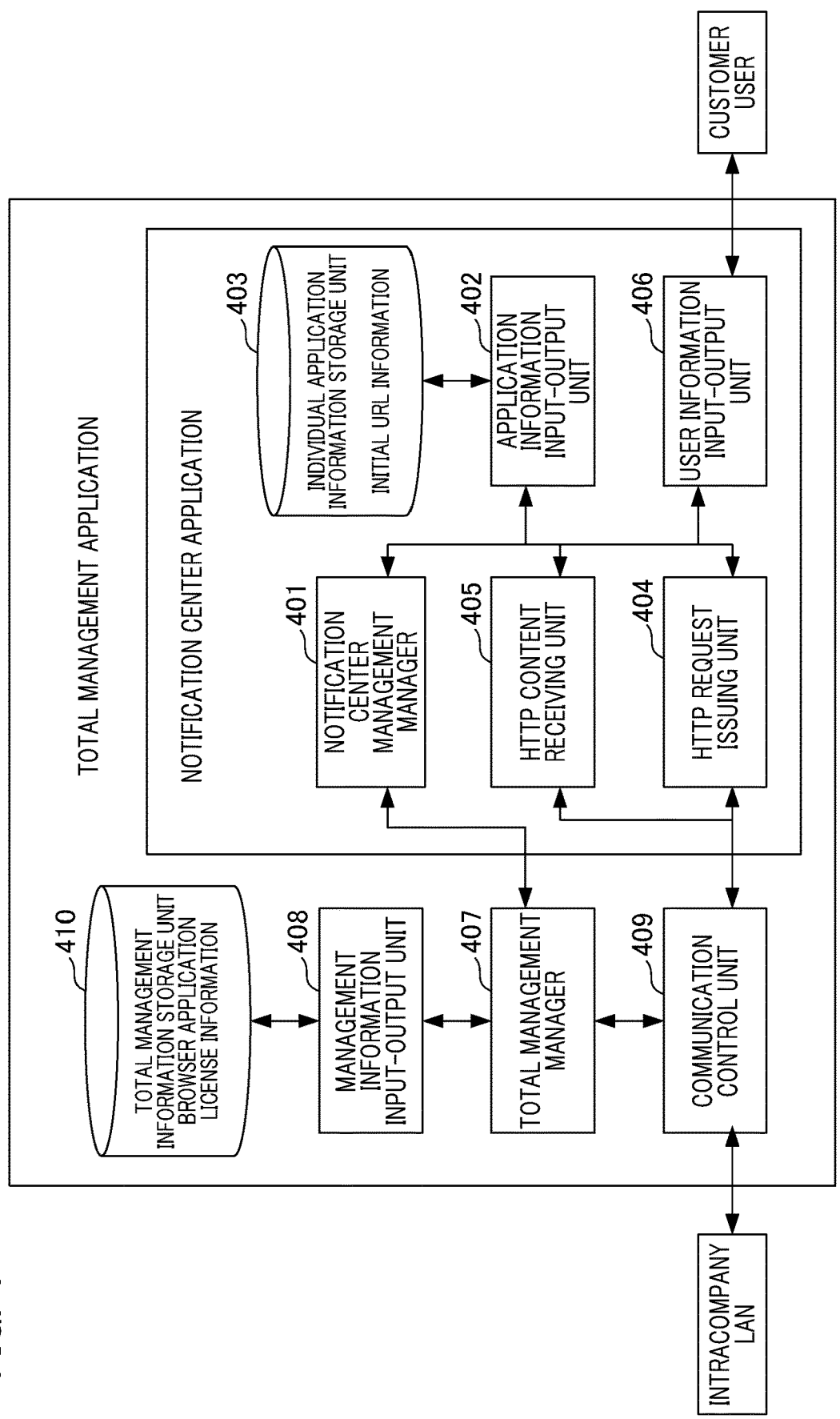
FIG. 4 is a diagram illustrating a software module configuration of the device.

FIG. 4 is a diagram illustrating a software module configuration for the device UI in the device 100.

The device 100 includes the "Notification center" application and a total management application. Hereinafter, a description will be given of a configuration of the "Notification center" application. A notification center management manager 401 issues, for each software module that configures the "Notification center" application, acquisition instructions for message content or display instructions for the content. In other words, the notification center management manager 401 manages the main processing of the "Notification center" application.

In particular, if an acquisition request for content is received from the user, the notification center management manager 401 determines access control for whether or not to perform content acquisition processing. In the access control, whether or not the browser application is installed in the same device and whether or not the browser application is in an available status are confirmed and a display control is performed based on the confirmation result.

An application information input-output unit 402 is an input-output unit that performs input and output of setting information that the "Notification center" application uses. If the application information input-output unit 402 receives a storage instruction or an acquisition instruction for data from the notification center management manager 401, the application information input-output unit 402 performs the input and output of information from a data storage unit. An individual application information storage unit 403 is a data storage unit storing setting information.

In the individual application information storage unit 403, information such as URL information for the message providing service 104 that provides messages to the user is stored. A HTTP request issuing unit 404 issues HTTP requests. A HTTP content receiving unit 405 receives HTTP content. A user information input-output unit 406 accepts a user's input and output for the "Notification center" application.

For example, if the user starts the "Notification center" application, the notification center management manager 401 executes following processing. First, the notification center management manager 401 issues an acquisition instruction for URL information for the message providing service 104 to the application information input-output unit 402 for acquiring content to be displayed from the message providing service 104. The application information input-output unit 402 that received the acquisition instruction for the URL information executes acquisition processing for the URL information, which is acquiring the URL information from the individual application information storage unit 403.

The application information input-output unit 402 that has acquired the URL information transmits the URL information to the notification center management manager 401. Next, the notification center management manager 401 transmits the URL information for the message providing service 104 to the HTTP request issuing unit 404 and issues an acquisition instruction for message content. The HTTP request issuing unit 404 that has received the acquisition instruction of the content accesses the specified URL and transmits a request for the content with the identification information for the device.

The message providing service 104 that has received the request of the content replies with message content to be distributed based on the identification information for the device. The HTTP content receiving unit 405 receives the message content and transmits the message content to the notification center management manager 401.

The notification center management manager 401 that has acquired the message content issues a display instruction for the content to the user information input-output unit 406. In this manner, the message content is provided to the user. Message content is HTML content, and thereby, a user can acquire new information while performing screen transition to a link destination by specifying a link included in the HTML content.

Further, there is information that is provided to a user by creating a link in the message content to a service other than the message providing service 104. For example, a case where transmitting to the user when the toner bottle sent to the user will be delivered by the delivery company may be considered. In such a case, if a link to a specified URL that displays a shipping status by the service provided by the delivery company can be provided, the user can be informed about an arrival schedule without manpower and therefore it is efficient.

Next, a description will be given of a configuration of the total management application other than "Notification center" application. A total management manager 407 manages an entire system of the device. The total management manager 407 performs management of all applications that are installed in the device and setting information. In addition, the total management manager 407 controls processing for copying or printing and manages a network module. Further, the total management manager 407 performs switching control of applications due to a call operation by the user.

A management information input-output unit 408 responds to a call request from an application installed in the device and responds to a storage request due to an installation of a new application. A total management information storage unit 410 stores applications that have been installed and setting values used by each application and the total management manager 407. A communication control unit 409 performs processing for external communication under the control of the total management manager 407.

<UI of the "Notification Center" Application>

FIGS. 5A and 5B, FIGS. 6A and 6B, and FIG. 7 are diagrams each illustrating an example of a UI of the "Notification center" application.

The "Notification center" application is called when a user presses a "Notification center" icon on the home screen shown in FIG. 2. If the "Notification center" application is called, a message list fora specified device or user is acquired from the message providing service 104.

Figure 5A:
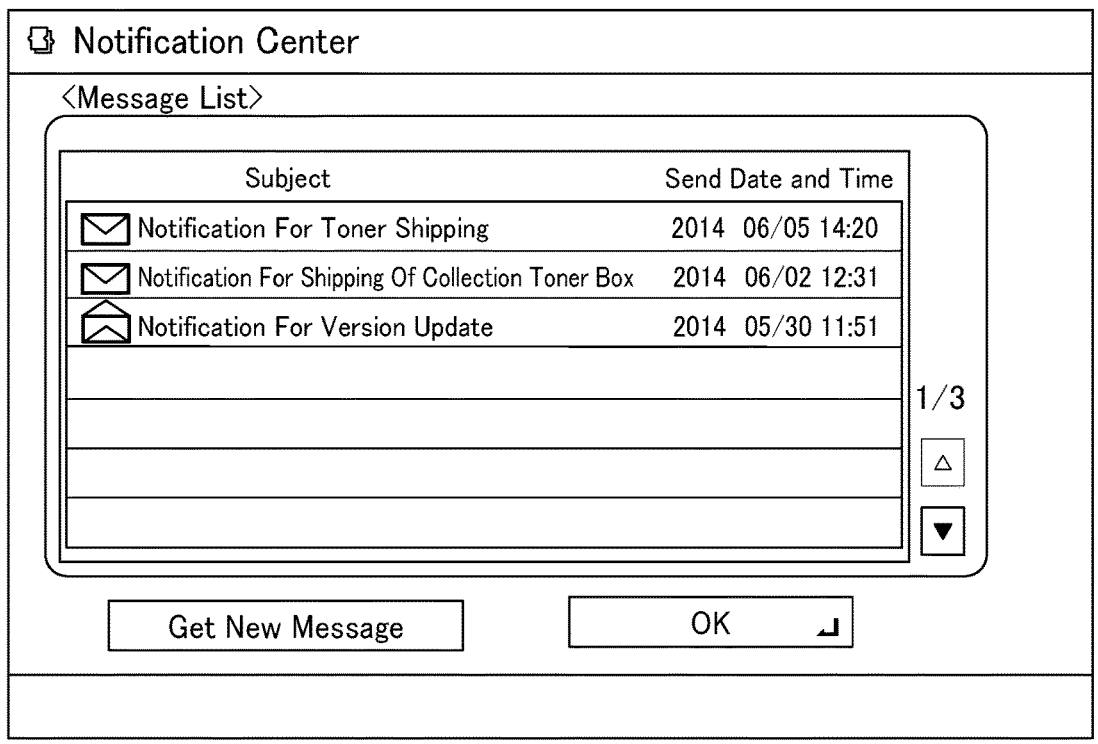
FIGS. 5A and 5B are diagrams each illustrating an example of a UI of a "Notification center" application.

FIG. 5A illustrates an example displaying content of the message list acquired from the message providing service 104 on an initial screen (TOP page) of the "Notification center" application. In the message list, a shipping notification for a toner from a sales company of the device to the user, a shipping notification for a collection toner box, and a notification related to a scheduled version up of firmware are listed.

Figure 5B:
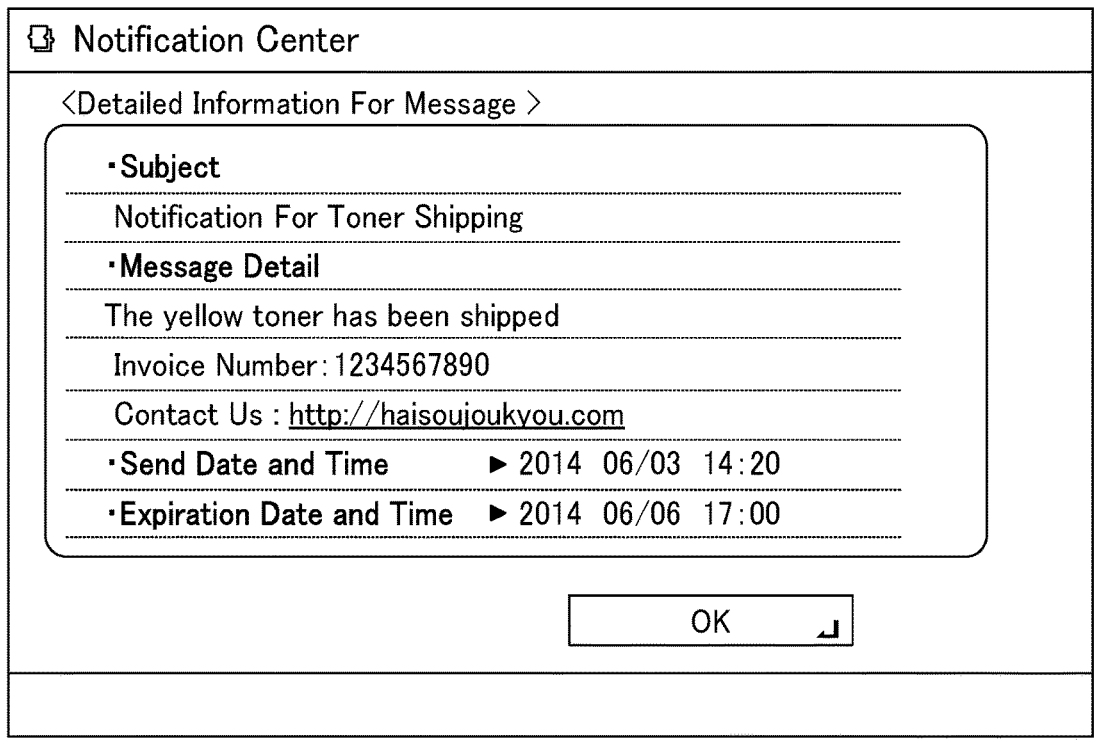

FIG. 5B illustrates an example displaying detailed information for one message selected by the user from the message list shown in FIG. 5A. In the detail information for the message, the same information as the subject of the message displayed in FIG. 5A is displayed as a "subject", and the actual message content is displayed in "detail information".

In the example shown in FIG. 5B, the details of the shipping notification for a toner for the user is illustrated, and a toner type (color), an invoice number used when the delivery company of the toner identifies a package, URL information, which is a link to a service provided by the delivery company, and the like. A service provided by the delivery company indicates the shipping information providing service 105 shown in FIG. 1, and is a service that can ascertain the shipping status of the toner by accessing the service and specifying the invoice number.

FIG. 6A illustrates an example of content displayed by a service that provides notification about a shipping status, which is provided by the shipping information providing service 105 shown in FIG. 1. The screen shown in FIG. 6A is displayed, for example, when the user has selected a link shown in FIG. 5B and, after the screen transition to the service provided by the delivery company has been performed, the user has input the invoice number of the package. By this screen, the status of a package under delivery (shipping status), the scheduled delivery date and time, the delivery route of the baggage until now and date and time information corresponding to the delivery route, and the like can be ascertained.

In the screen shown in FIG. 6A, an advertisement or information for a service provided by the delivery company or other related companies may be displayed. The message providing service 104 wants to guide the user to the screen shown in FIG. 6A in order to accurately transmit, to the user, the shipping status of a package requested for delivery. However, after this screen, it is desirable that the message providing service 104 avoid transiting to information that is not related to the maintenance business for the device, which is the original use.

Therefore, when accessing the other information providing service 106 shown in FIG. 1, which is a service different from original use, due to the user selecting the link, in other words, when performing screen transition to a URL provided by different services, the "Notification center" application suppresses the access. The details of processing related to access control will be described with reference to FIG. 8.

However, the user selects the link because the user wants to browse content provided by the external service that the link indicates. Therefore, if it is an environment in which a browser application of the device 100 can be used, the "Notification center" application can be temporarily terminated, and the content corresponding to the link destination that the user has requested can be displayed by the browser application.

Here, starting the browser application and transiting to the page of the link destination requested in the "Notification center" application by the user itself is inefficient. Accordingly, the "Notification center" application can make the browser application take over the request from the user. FIG. 6(B) illustrates an example of a screen displayed in this case.

FIG. 6B illustrates an example of a screen displayed by the "Notification center" application when it is an environment in which a browser application of the device 100 can be used. More specifically, a message is displayed confirming to the user that the screen transition after this is performed by using not the "Notification center" application but rather the browser application. If the user wishes to continue and transit to a screen provided by the external service, the browser application will be started. Further, due to the "Notification center" application providing URL information for the link destination to the browser application, continuous screen transition can be provided.

Figure 7:
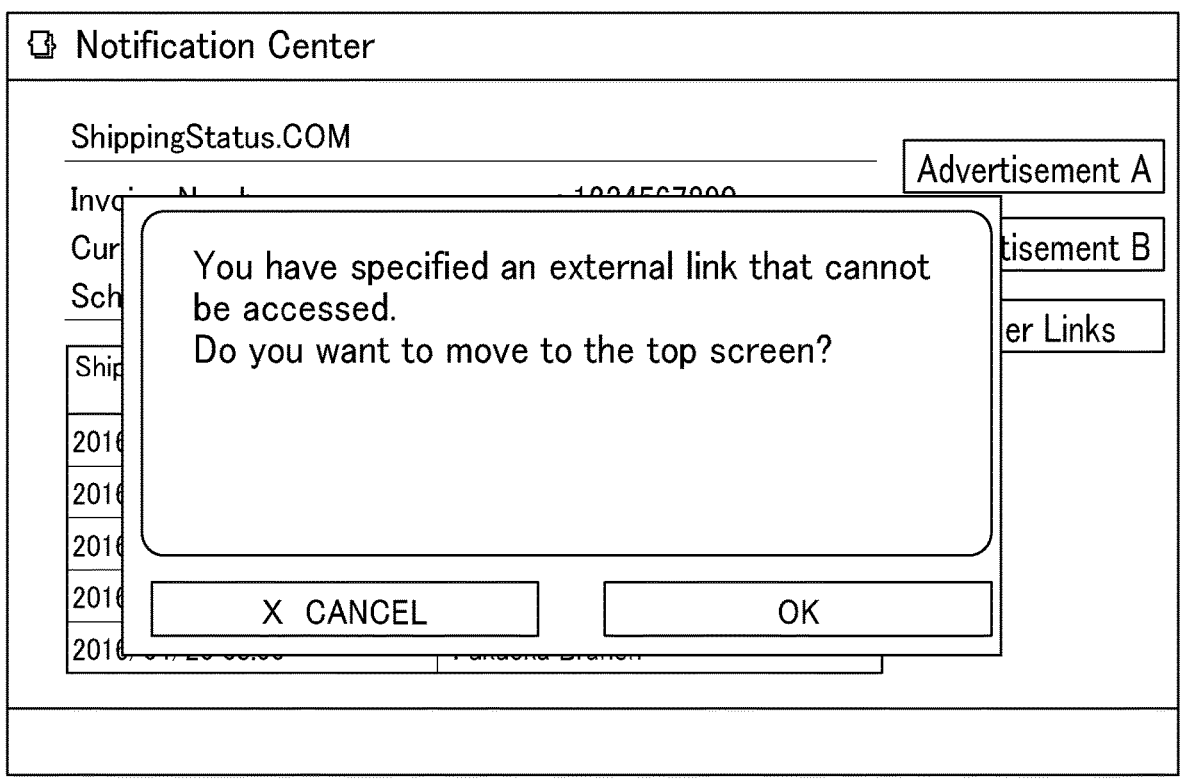
FIG. 7 is a diagram illustrating an example of a UI of the "Notification center" application.

FIG. 7 illustrates an example of a screen displayed by the "Notification center" application when it is not an environment that a browser application of the device 100 can be used. More specifically, a message is displayed displaying that an accessing a service not directly related to the message providing service 104 is forbidden, and confirming whether or not to transit to the screen of the message list again.

Figure 8:
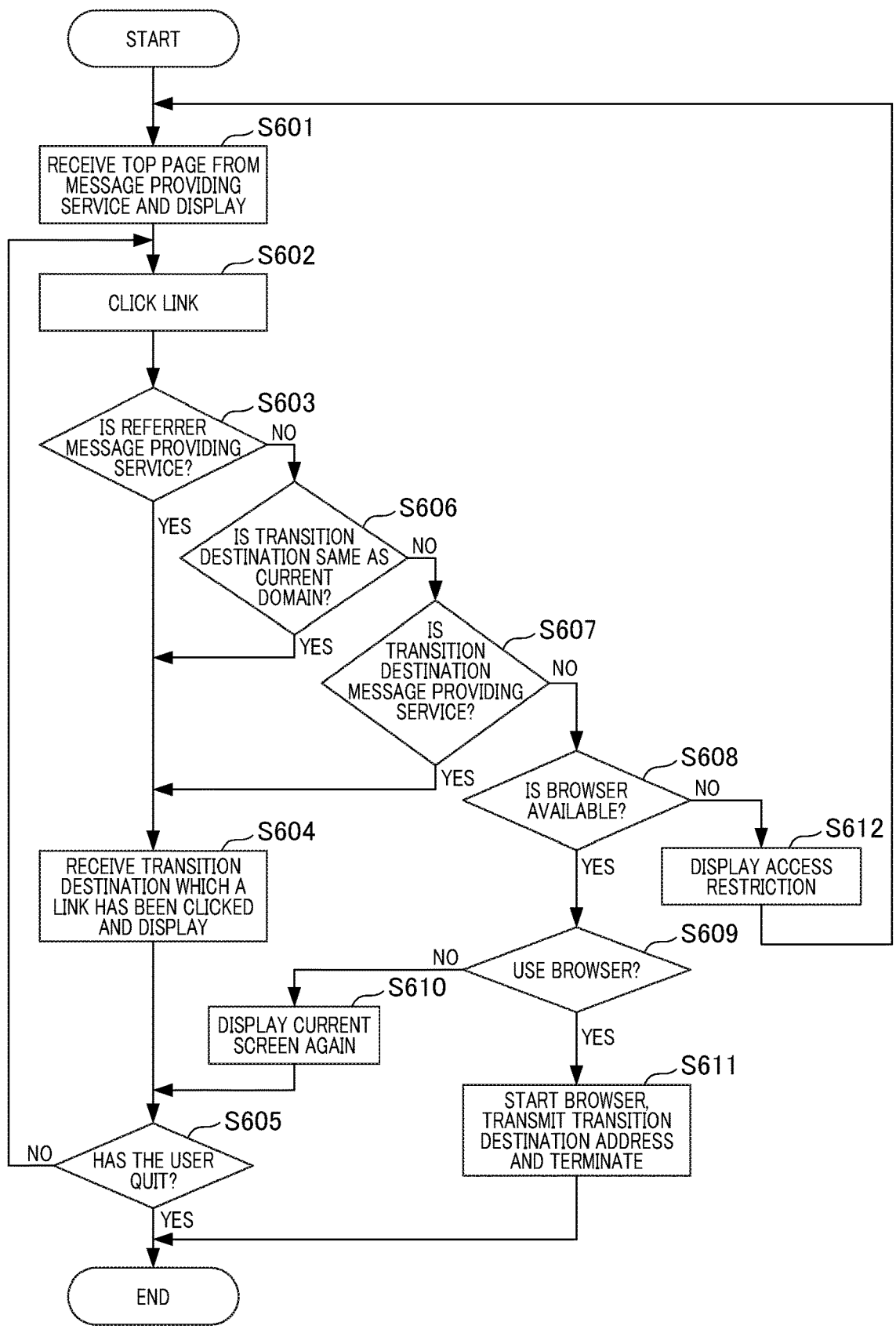
FIG. 8 is a flowchart illustrating a behavior of the "Notification center" application.

<Behavior of the "Notification Center" Application> FIG. 8 is a Flowchart Illustrating a Behavior of the "Notification Center" Application.

More specifically, FIG. 8 is a flowchart illustrating processing related to the access control when, after calling the "Notification center" application by pressing the "Notification center" icon or the like, displaying the message list or the link to other services is selected.

If the user uses various services on the UI of the device 100 and browses information provided by the various services, the device may occupy the device 100. In order to suppress such a situation, the "Notification center" application controls the access of the user as follows, and cooperates with other applications. Note that the processing shown in FIG. 8 is stored in either of the ROM 304 or the storage device 306 shown in FIG. 304, loaded in the RAM 305 as needed, and executed by the CPU 307.

The processing shown in FIG. 8 is started when the "Notification center" application is called such as when the user has pressed the "Notification center" icon on the UI of the device 100, or the like. In step S601, the "Notification center" application transmits an identifier of the device to the message providing service 104. Then, the "Notification center" application receives, from the message providing service 104, a message list generated for the local device as content for displaying on the initial screen.

In detail, the notification center management manager 401 issues a request to the message providing service 104 via the HTTP request issuing unit 404 and receives the content via the HTTP content receiving unit 405. The notification center management manager 401 displays the received content such, as the screen shown in FIG. 5A, via the user information input-output unit 406.

In step S602, the "Notification center" application detects pressing a link to an arbitrary ULR included in the HTML content browsed by the user. As a result, the user information input-output unit 406 accepts a request for displaying the content corresponding to the link destination, and transmits the request with the URL information to the notification center management manager 401.

In step S603, if the notification center management manager 401 receives the request with the URL information for the link destination, the notification center management manager 401 performs the following determination. The notification center management manager 401 determines whether or not to permit the request from the user based on two pieces of domain information, which are a referrer (referrer of the link destination) that is a link source of the request and the URL information for the link destination. More specifically, first, in step S603, the notification center management manager 401 determines whether or not the domain information of the referrer indicates the domain to which the message providing service 104 belongs.

If the domain information of the referrer indicates the domain to which the message providing service 104 belongs, in other words, if the domain information of the referrer matches the domain of the message providing service 104, the notification center management manager 401 proceeds processing to step S604. In step S604, the notification center management manager 401 determines that the user's request is a transition required for acquiring information necessary for the maintenance business and thereby permits the request from the user. That is, the notification center management manager 401 acquires the URL information for a transition destination requested from the user and controls the display using content corresponding to the URL information. In this manner, the notification center management manager 401 performs display control such that the referenced content, which can be referred from the content provided by a reliable domain, will be displayed.

In step S605, the notification center management manager 401 determines whether or not the user has ended the "Notification center" application. More specifically, when the user has ended the "Notification center" application and the notification center management manager 401 receives a signal of application termination, the "Notification center" application terminates. Further, when the user stays on the displayed screen and continues to use the "Notification center" application, the notification center management manager 401 advances the processing to step S602.

In contrast, in step S603, if the domain that the referrer indicates does not indicate the message providing service 104, the notification center management manager 401 advances the processing to step S606. In step S606, the notification center management manager 401 determines whether or not the URL information for the link destination, in other words, the domain information for the service to be requested, matches the domain information of the referrer.

If the domain information for the service to be requested matches the domain information of the referrer, the notification center management manager 401 advances the processing to step S604, and permits the request from the user. In contrast, if the domain information for the service to be requested does not match the domain information of the referrer, the notification center management manager 401 advances the processing to step S607. In step S607, the notification center management manager 401 determines whether or not the domain information for the service to be requested indicates the message providing service 104.

If the domain information for the service to be requested indicates the message providing service 104, the notification center management manager 401 advances the processing to step S604 and permits the request from the user. In contrast, if the domain information for the service to be requested does not indicate the message providing service 104, the notification center management manager 401 advances the processing to step S608.

In step S608, the notification center management manager 401 communicates with the total management manager 407 to determine whether or not the browser application is available. More specifically, the notification center management manager 401 determines whether the browser application is installed in the device 100 and whether or not the browser application is in an available status for the user. If the browser application is in an available status, the request from the user may be continuously accepted by the browser application.

In this case, the notification center management manager 401 transmits the URL information for the link destination requested from the user to the total management manager 407 and requests starting the browser application. More specifically, if the browser application is available, the notification center management manager 401 advances the processing to step S609. In step S609, the notification center management manager 401 confirms whether or not the user will continue browsing the link destination using the browser application. More specifically, the notification center management manager 401 displays the screen as shown in FIG. 6B for displaying a message indicating that a transition to an external link will be performed.

If the user continues browsing the link destination using the browser application, the notification center management manager 401 advances the processing to step S611. In contrast, if the user does not continue browsing the link destination using the browser application, the notification center management manager 401 advances the processing to step S610. In step S610, the notification center management manager 401 displays the currently displayed screen again via the user information input-output unit 406 and proceeds the processing to step S605.

In step S611, the notification center management manager 401 starts the browser application via the total management manager 407. Further, the notification center management manager 401 provides the URL information for the link destination requested from the user, in other words, the URL information for the transition destination, and terminates the processing.

In contrast, if the browser application is not available in step S608, the notification center management manager 401 advances the processing to step S612. In step S612, the notification center management manager 401 displays a message to the user indicating that a transition to the link destination cannot be performed on the screen and the processing proceeds to step S601. More specifically, a screen as shown in FIG. 7 is displayed.

In this manner, the "Notification center" application performs display control for permitting access only for the original use, for example, an access to a services necessary for the maintenance business, and thereby, the "Notification center" application can appropriately transmit a message that should be transmitted to the user. Further, in this manner, restricting an unnecessary access to an external service can be performed and thereby occupying the operation panel or the like of the device 100 by the user can be suppressed.

In addition, since the user may access an arbitrary service in the "Notification center" application, other than the device 100 being occupied, it is considered that the following situation may occur. Specifically, there are various services on the internet, and incompatible HTML content may be a problem to display.

If the user accesses a service different from the original use by using the web browser function of the "Notification center" application and the content of that service cannot be correctly displayed because the content is not compatible, there is a possibility that complaints will be received from the user. From the viewpoint of the compatibility as described above, in a business application, performing access control and restricting the display to the original use or the service may suppress the display problem due to the compatibility.

Note that, while a case in which the "Notification center" application being called (started) from the icon on the home screen has been described in the present embodiment, it is not limited thereto. Starting the "Notification center" application may include a case of switching processing, which is displaying on the screen while running in the background. In other words, whether or the "Notification application" has already started is not limiting in this context.

Furthermore, while a case that, in step S603, if the domain indicated by the referrer does not indicate the domain to which the message providing service 104 belongs, the processing proceeding to step S606 has been described in the present embodiment, it is not limited thereto. For example, it is possible not to perform the determination of step S606 and the processing may proceed to step S607, and it is also possible not to perform the determinations of step S606 to S608 and the processing may proceed to step S612. Similarly, in the processing of step S606 or S607, if each result of the determination is "No", the processing may proceed to step S612.

Furthermore, while a case that the "Notification center" application displays the HTTP content provided by the message providing service 104 has been described in the present embodiment, it is not limited thereto. It may be configured such that the "Notification center" application displays content provided by another predetermined providing service. In this case, in the processing shown in FIG. 8, a place described as "message providing service" may be read as "predetermined providing service" for execution. At this time, there may be more than one "predetermined providing service".

Second Embodiment

In the first embodiment, an example in which the access control is performed based on the two domains of which the referrer and the URL information for the link destination has been described. However, there may be a case in which the access range is expanded depending on the business. In such a case, in addition to the access control in the first embodiment, a list of domains that can be accessed (white list) is provided to the "Notification center" application so that the access range can be dynamically expanded, in the present embodiment.

FIG. 9 is a diagram illustrating a part of the content data provided by the message providing service 104.

For example, a domain list for which access is permitted is added as Permit-Domain to a HTTP header. In this manner, the access range can be flexibly controlled without using complicated version management and the like for the white list.

More specifically, the notification center management manager 401 acquires a list of domains that can be accessed from content data provided by the message providing service 104. Then, in the processing shown in FIG. 8, if it is determined "No" in either of the processing of step S603 to 608, the notification center management manager 401 determines whether the domain of the link destination is included in the above domain list that can be accessed.

Then, if the domain of the link destination is included in the above domain list that can be accessed, the processing proceeds to step S604 and the request from the user is permitted. In contrast, if the domain of the link destination is not included in the above domain list that can be accessed, the processing proceeds to step S612.

<Example of Application UI when Applied in General Information Processing Apparatus>

Figure 10:
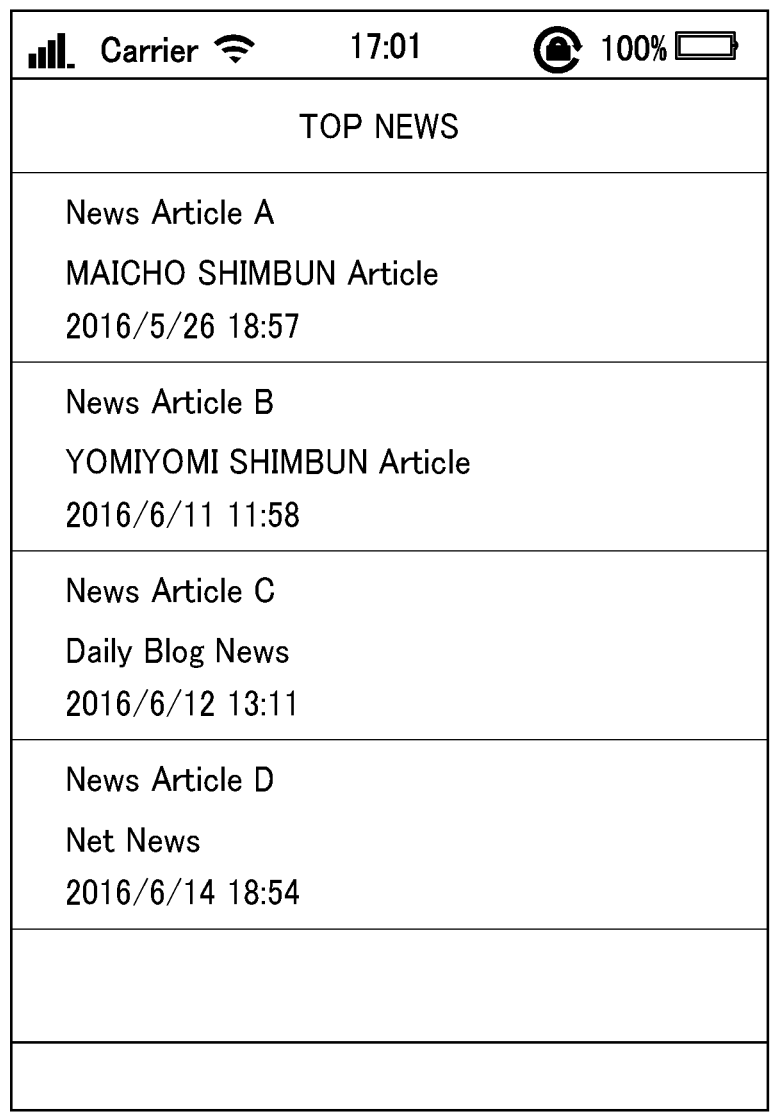
FIG. 10 is a diagram illustrating an example in a case where the present invention is applied to another information processing apparatus.

FIG. 10 is a diagram illustrating an example in a case where the device 100 according to the present invention is applied by a general information processing apparatus.

For example, it is assumed that the device 100 is a smartphone and, in the smartphone, a news application is installed as a web application having a web browser function.

The new application acquires news content from a service that distributes news. In each news content, a link indicating which mass media has distributed the original news content thereof is shown. The user can transit to a service that enables browsing the original news content by selecting the link. The news application allows a link to a news site which is a specific service for displaying news content, but wants to avoid problems such as screen (layout) corruption or the like due to the transition to various sites other than the news site.

In such a case, the access control may be performed based on the two domains, which are the referrer and the URL information for the link destination. Accordingly, the device 100 can be applied by a general information processing apparatus in the present invention.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154988, filed Aug. 5, 2016, which is hereby incorporated by reference wherein in its entirety.

What is claimed is:

1. An information processing apparatus in which an application having a web browser function is installed, comprising:
a memory storing instructions; and
a processor which is capable of executing the instructions causing the information processing apparatus to:
control a display on a displaying unit using the web browser function and content provided by a predetermined providing service that belongs to a predetermined domain;

accept, from a user, a selection of a link included in the display;

determine whether URL information as a referrer included in a HTTP request issued by the web browser function based on an accepting of the selection of the link indicates the predetermined domain, wherein the referrer is URL information of a web page on which the link has been arranged;

determine whether a domain of a destination of the issued HTTP request indicates the predetermined domain;

in a case where it is determined that the URL information as the referrer indicates the predetermined domain, control display of a succeeding web page corresponding to the link using content received according to the issued HTTP request; and control display of a screen indicating an access error, if the URL information of the referrer does not indicate the predetermined domain and the domain of the destination of the issued HTTP request does not indicate the predetermined domain.

2. The information processing apparatus according to claim 1, wherein the instructions further cause the information processing apparatus to:

determine whether the domain of the destination of the issued HTTP request matches the domain that the URL information as the referrer indicates, if the URL information as the referrer does not indicate the predetermined domain, wherein the display using the content corresponding to the link is performed, if the domain of the destination of the issued HTTP request matches the domain that the URL information as the referrer indicates.

3. The information processing apparatus according to claim 1, wherein, if another web browser program different from the application is installed in the information processing apparatus, the instructions further cause the information processing apparatus to:

transmit information corresponding to the link to the another web browser program, and start the web browser program without displaying the screen indicating the access error in a case where the URL information of the referrer does not indicate the predetermined domain and the domain of the destination of the issued HTTP request does not indicate the predetermined domain.

4. The information processing apparatus according to claim 1, the instructions further cause the information processing apparatus to:

acquire a list of domains that can be accessed, provided by the predetermined providing service;

determine, if the URL information as the referrer does not indicate the predetermined domain and the domain of the destination of the issued HTTP request does not indicate the predetermined domain, whether the domain of the destination is included in the list; and control the display using the content corresponding to the link, if the domain of the destination is included in the list.

5. A method for controlling an information processing apparatus in which an application having a web browser function is installed, the method comprising:

controlling a display on a displaying unit using the web browser function and content provided by a predetermined providing service which belongs to a predetermined domain;

accepting, from a user, a selection of a link included in the display;

determining whether URL information as a referrer included in a HTTP request issued by the web browser function based on an accepting of the selection of the link indicates the predetermined domain, wherein the referrer is URL information of a web page on which the link has been arranged;

determining whether a domain of a destination of the issued HTTP request indicates the predetermined domain;

in a case where it is determined that the URL information as the referrer indicates the predetermined domain, controlling display of a succeeding web page corresponding to the link using content received according to the issued HTTP request; and if the URL information of the referrer does not indicate the predetermined domain and the domain of the destination of the issued HTTP request does not indicate the predetermined domain, controlling display of a screen indicating an access error.

6. A non-transitory storage medium on which is stored a computer program for making a computer execute a method for controlling an information processing apparatus in which an application having a web browser function is installed, the method comprising:

controlling display on a displaying unit using the web browser function and content provided by a predetermined providing service which belongs to a predetermined domain;

accepting, from a user, a selection of a link included in the display;

determining whether URL information as a referrer included in a HTTP request issued by the web browser function based on an accepting of the selection of the link indicates the predetermined domain, wherein the referrer is URL information of a web page on which the link has been arranged;

determining whether a domain of a destination of the issued HTTP request indicates the predetermined domain;

in a case where it is determined that the URL information as the referrer indicates the predetermined domain, controlling display of a succeeding web page corresponding to the link using content received according to the issued HTTP request; and URL information of the referrer does not indicate the predetermined domain and the domain of the destination of the issued HTTP request does not indicate the predetermined domain, controlling display of a screen indicating an access error.

7. The information processing apparatus according to claim 1, wherein, in a case where it is determined that the URL information as the referrer indicates the predetermined domain, the display using the content corresponding to the link is performed even if the domain of the destination of the issued HTTP request does not indicate the predetermined domain.

8. The information processing apparatus according to claim 1, wherein, in the case where it is determined that the domain of the destination of the issued HTTP request indicates the predetermined domain, the display using the content corresponding to the link is performed even if the URL information as the referrer does not indicated the predetermined domain.

9. The information processing apparatus according to claim 2, the instructions further cause the information processing apparatus to:
acquire a list of domains that can be accessed, provided by the predetermined providing service;
determine, if the URL information as the referrer does not indicated the predetermined domain and the domain of the destination of the issued HTTP request does not match the domain that the URL information as the referrer indicates, whether the domain of the destination is included in the list; and
control the display using the content corresponding to the link, if the domain of the destination is included in the list.

* * * * *